United States Patent [19]

Tisma

[11] Patent Number: 5,460,258
[45] Date of Patent: Oct. 24, 1995

[54] AUTOMATIC PACKAGING MACHINE WITH RANDOM INPUT AND A DEFINED OUTPUT

[75] Inventor: Stevan Tisma, Elk Grove Village, Ill.

[73] Assignee: Tisma Machinery Corporation, Elk Grove Village, Ill.

[21] Appl. No.: 169,426

[22] Filed: Dec. 17, 1993

[51] Int. Cl.$^6$ .................................................. B65G 25/00
[52] U.S. Cl. ........................ 198/430; 198/429; 414/790.4
[58] Field of Search ................................... 198/429, 430; 414/790.4, 794.7

[56] References Cited

U.S. PATENT DOCUMENTS

| | | | |
|---|---|---|---|
| 4,325,475 | 4/1982 | Spalding | 198/429 |
| 4,399,905 | 8/1983 | Lance et al. | 198/430 |
| 4,802,570 | 2/1989 | Hirsch et al. | 198/430 X |
| 5,018,334 | 5/1991 | Guttinger et al. | 198/429 X |
| 5,191,963 | 3/1993 | Delsanto | 198/429 |
| 5,261,522 | 11/1993 | Guttinger et al. | 198/430 X |

Primary Examiner—H. Grant Skaggs
Assistant Examiner—Carol L. Druzbick
Attorney, Agent, or Firm—Laff, Whitesel, Conte & Saret, Ltd.

[57] ABSTRACT

A loader for an automatic packaging machine received an inflow of product subject to a randomly variable product delivery. The loader delivers an outflow of product at a defined rate and in a predetermined pattern despite the variations of the inflow. A buffer storage device stores an adjustable amount of product between the inflow and the defined outflow in order to compensate for the random variables. The buffer storage device is a link chain trained over three principal sprocket wheels arranged in a triangular pattern with the wheel at an apex of the triangle being in a fixed position. The portion of the link chain which forms the base of the triangle provides the buffer storage. The product output is taken from approximately a midpoint on the base of the triangle. The two sprocket wheels at the base angles of the triangle are movable so that the base of the triangle may move in one direction to hold more product in buffer storage or may move in an opposite direction to deliver product which is taken from the buffer storage.

11 Claims, 4 Drawing Sheets

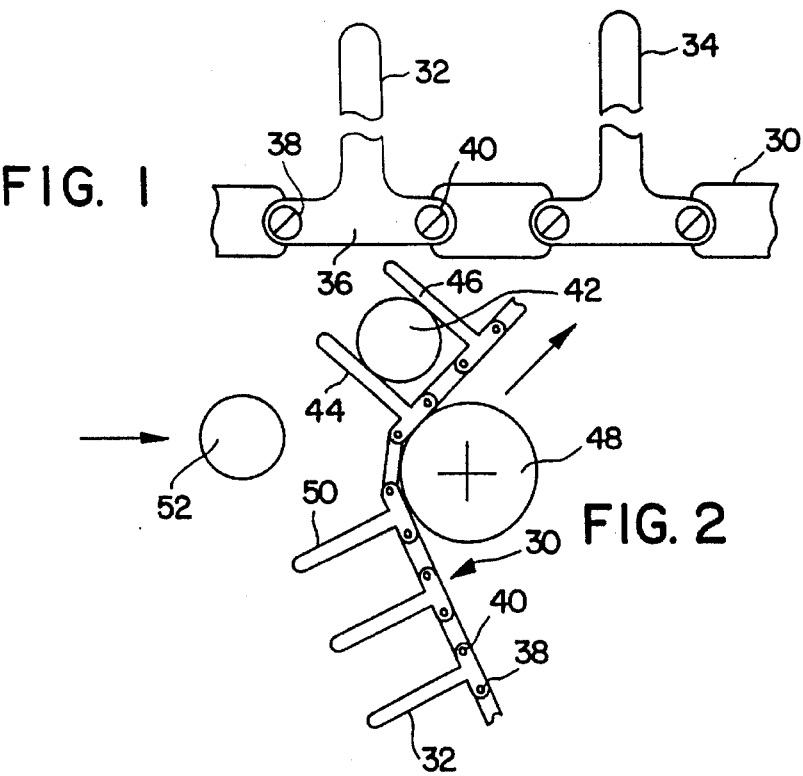
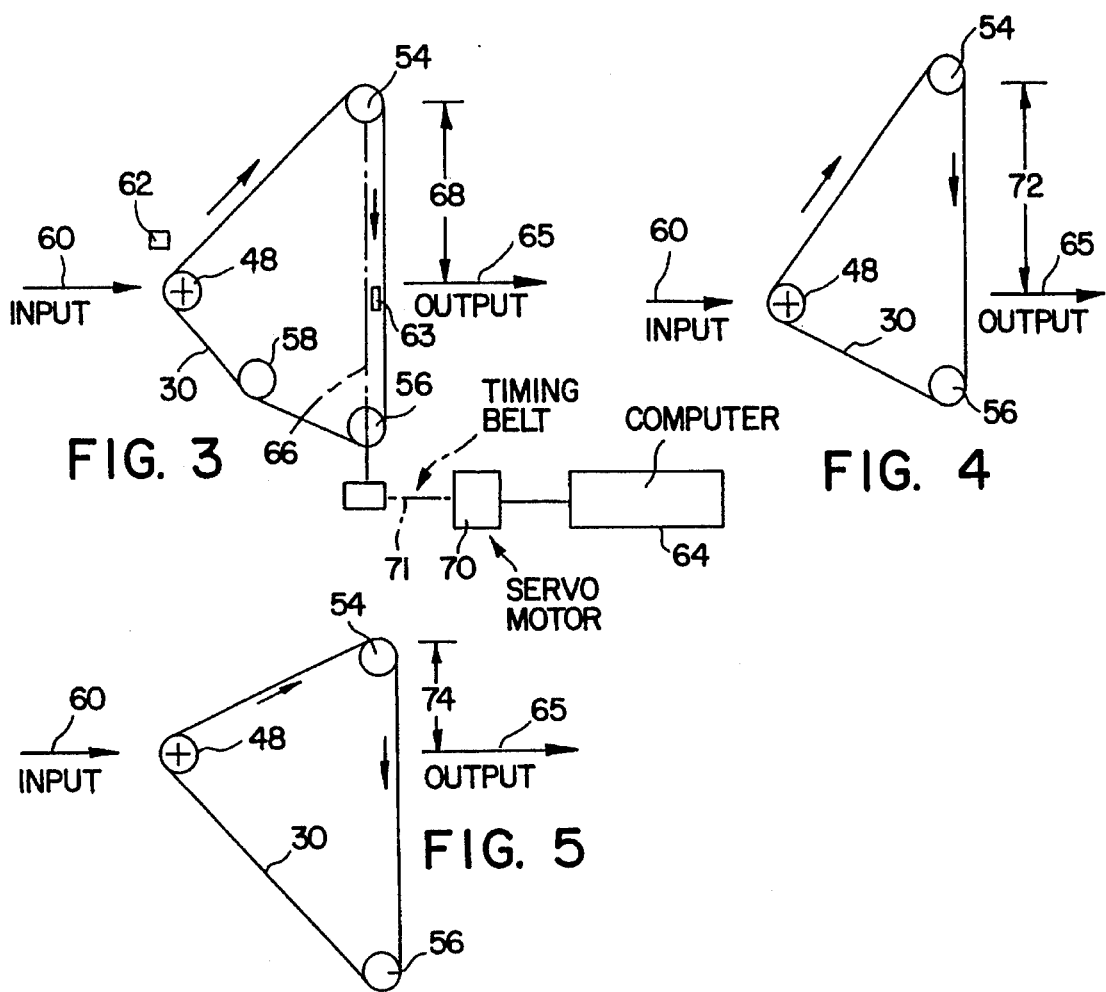

AUTOMATIC PACKAGING MACHINE WITH RANDOM INPUT AND A DEFINED OUTPUT

This invention relates to automatic packaging machines and more particularly to such machines with random input and programmed or defined output.

Automatic packaging machines receive product input, usually from a conveyor belt, and provide a packaged or defined output. The conveyor does not always deliver the input on time, or in a neat and orderly manner. Sometimes the inflow of products is so poorly positioned that it must be swept away and diverted into a salvage bin for recycling to the input. Therefore, for these and other reasons, sometimes there are gaps in the input delivery or inflow of products which must be detected so that the output to boxes or other containers may be aborted.

On the other hand, the automatic packaging machine output is a neat and orderly procedure where boxes or other containers are picked up, one at a time, and then filled, sealed and delivered in a defined output. Currently, performing the task accomplished by the automatic packaging machine requires some means for detecting a missing or an improperly or incorrectly picked up product. Then, a box is not filled at the time when that product's turn comes to fill a box. The non-filled or improperly filled box must then be discarded, diverted or otherwise taken out of the line. Otherwise, a company may sell its box with a defective, insufficient or non-existing load therein as its product.

Still another consideration is to provide a general purpose module which may be combined with other general purpose modules in order to make a custom designed automatic packaging machine. Thus, the invention may be inserted into almost any packaging machine at almost any suitable location in order to buffer store product. For example, it may be possible that half way through a sequence for packaging a product, it is necessary to buffer store in coming products in order to coordinate work stations. This buffer storage may greatly simplify software otherwise required to coordinate inflow and outflow of the automatic packaging machine.

All of these and similar considerations lead to more complicated automatic packaging procedures than are really necessary. It would be far better to provide some means for buffer storing enough product to replace the missing product or store the surplus product at the point where the loading occurs. Then product may be loaded at random at the input to an automatic packaging machine and delivered with an output from that machine that is defined for the specific product which is then being packaged.

Another consideration is the need for flexibility in packaging configurations. For example, sometimes two or three products are packaged in a horizontal row within a container. Other times, two or three products are packaged in a vertical column within a container. Perhaps, product may be packaged in both vertically and horizontally orientations, as for example, where four products are packaged in two side by side columns, each of the columns including two products. The examples could be expanded almost as much as the imagination can conceive. The point is that, to be most valuable, an automatic packaging machine should be flexible enough to handle any of these and similar configurations. For convenience of expression, all of these and similar flexible configurations are herein incorporated within the term "defined output."

Yet another consideration is the need to package different products in different containers. Some of these needs have already been addressed, as where product is configured in horizontal rows, vertical columns, or a combination of rows and columns. These examples could be expanded to cover pouches of particulate matter (such as flour), pouches of small hard or soft matter (such as candies), boxes, or many other containers. Therefore, for convenience of expression, the flexibility to package many different kinds of products in many different types of container is hereinafter called "multi-tasking".

Accordingly, an object of this invention is to provide new and improved multi-tasking, automatic packaging machines which may accept a random input and issue a programmed or defined output of products. Here an object of the invention is to provide a buffer storage of product which allows the product input to fluctuate at random while having a product ready to send to a package, box, or container despite such fluctions. In this connection, an object is to retain a precise item-by-item control over the product in buffer storage so that the exact location of every product in buffer storage is known at all times.

Yet another object is to provide a general purpose buffer module for storage of product wherever it may be convenient or necessary to so store it.

In keeping with an aspect of the invention, a plurality of storage areas are provided by a number of spaced parallel fingers which are attached to a link-chain conveyor. The link chain is trained over three principal sprocket wheels, with perhaps a fourth and tension controlling sprocket wheel in association therewith. The three principal sprocket wheels are arranged in a triangular pattern with the wheel at an apex of the triangle being in a fixed position. The portion of the link chain which forms the base of the triangle provides the buffer storage. The product output is taken from approximately a midpoint on the base of the triangle. The two sprocket wheels at the base angles of the triangle are movable so that the base of the triangle may move in one direction to hold more product in buffer storage or may move in an opposite direction to deliver product which is taken from the buffer storage.

Preferred embodiments of the invention are shown in the attached drawings, in which:

FIG. 1 shows a few links in a link chain conveyor with fingers added according to the invention.

FIG. 2 shows how the fingers may receive product when they automatically open as they travel around a sprocket wheel;

Figure 6:
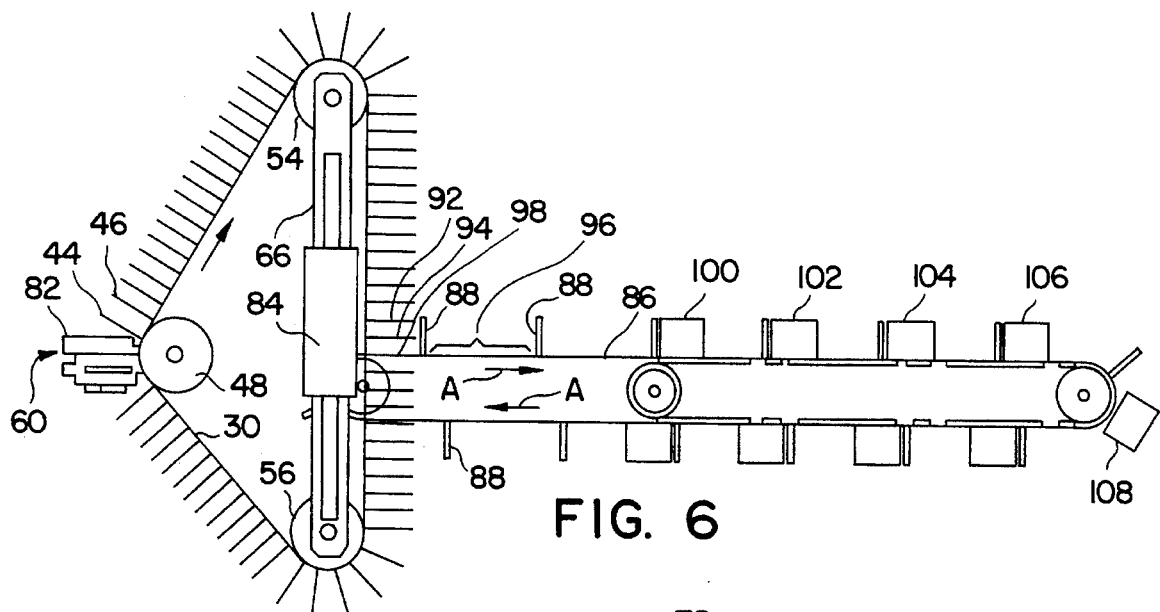
Figure 7:
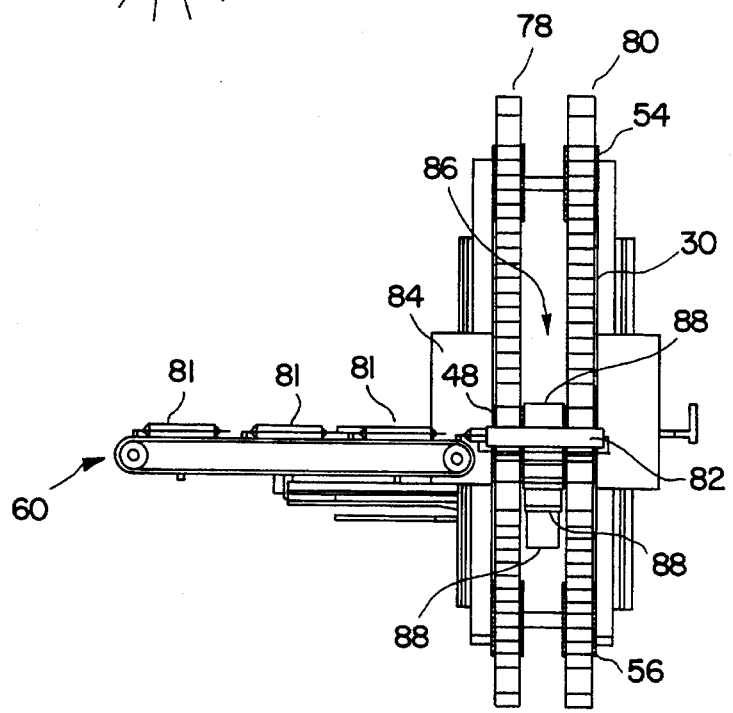
Figure 8:
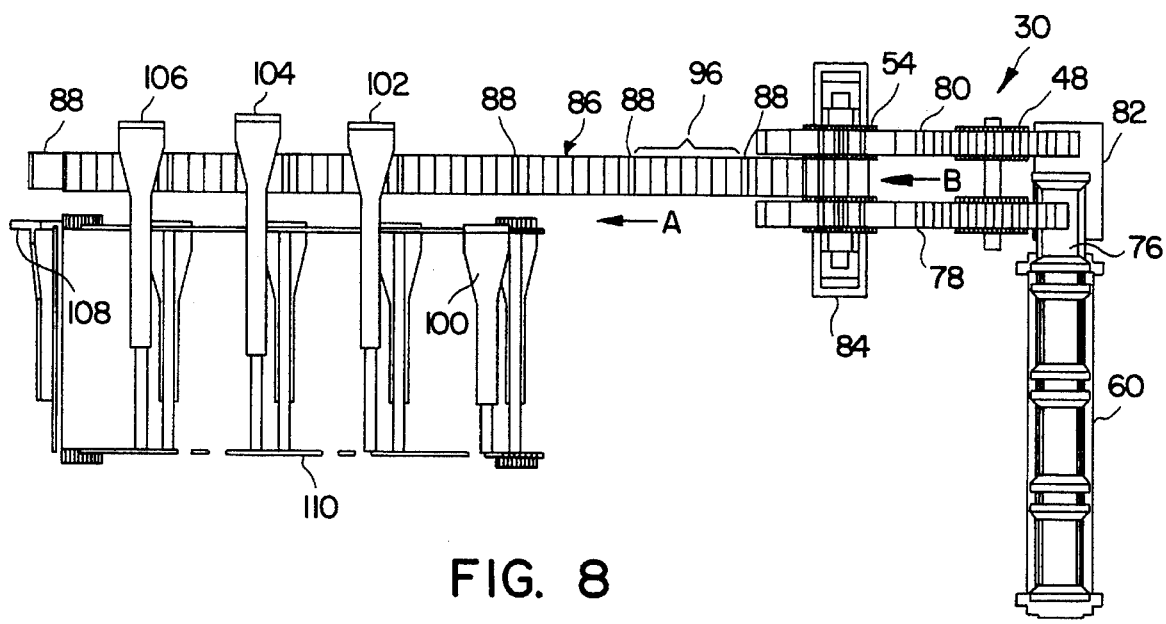
Figure 9:
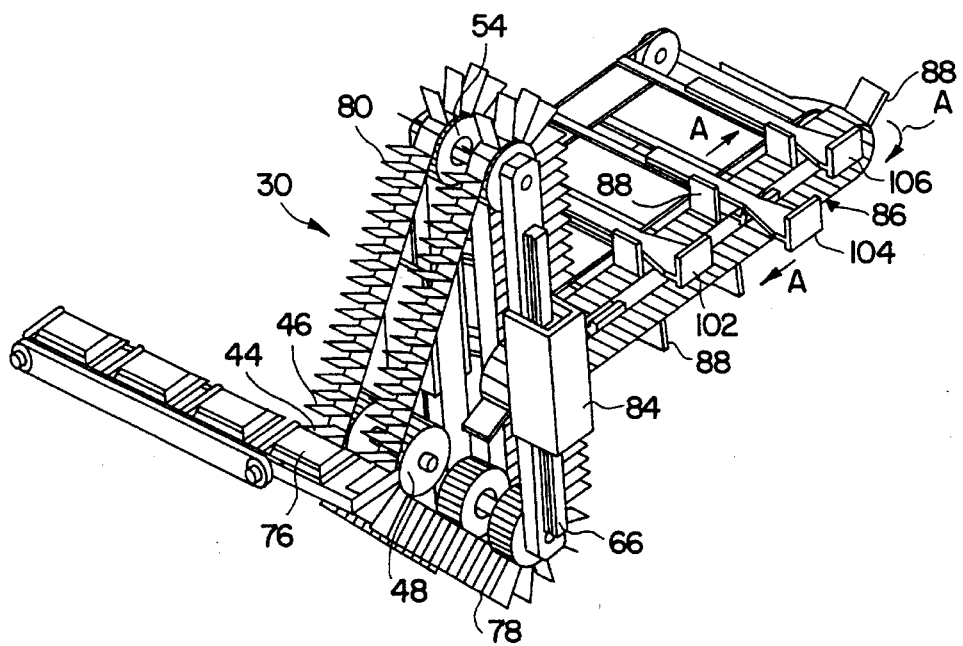

FIG. 3 graphically shows a conveyor incorporating the principles of the invention;

FIG. 4 shows how the conveyor of FIG. 3 is operated to increase the number of product in buffer storage;

FIG. 5 shows how the conveyor of FIG. 3 is operated to take more product out of buffer storage;

FIG. 6 is a side elevation of the physical structure which is explained by the graphical presentation of FIG. 3;

FIG. 7 is an end elevation of the FIG. 6 structure, showing in association with an input conveyor;

FIG. 8 is a top plan view of the FIG. 7 structure;

FIG. 9 is a perspective view of the structure of FIGS. 7–8; and

FIGS. 10A–E graphically illustrate how the invention may be used to insert product into boxes with different configurations.

The structure of the conveyor used by the invention is shown in FIGS. 1 and 2. A conventional link chain 30 has a number of elongated fingers 32, 34 bolted thereto. Each finger has a somewhat "T-shape" with the cross arm of the "T" forming a base member 36 having two holes therein to receive bolts or screws 38, 40 for attachment of the finger at the axes of adjacent rollers on the link chain. The fingers 32, 34 may be attached to the link chain at any desired spacing along the length thereof. For example, every adjacent link or every other link in the chain 30 may have a finger attached thereto. Or, perhaps three fingers may be attached at equal spaced intervals and then a space occurs with no finger attached thereto. The particular spacing of the fingers is selected according to the physical dimensions of the product.

In like manner, any suitable number of fingers may be attached to the link chain in any desired location. It is also possible to vary the existing finger positions in order to set up a packaging machine in different configurations for packaging different products.

The spacing between the fingers is also determined by the geometrical configuration of the product. For example, in FIG. 2, the product 42 is captured between fingers 44, 46. If product 42 is larger or smaller, then fingers 44, 46 may be connected to the chain at points which are further apart or closer together. Likewise, the spacing between and length of adjacent fingers could be arranged to pick up a plurality of products, such as say, two or three products at a time, depending also upon the nature of the product.

The products are fed into the fingers at a point adjacent a sprocket wheel 48 at the apex of the triangle since the fingers automatically spread apart somewhat to present open jaws as they go around the sprocket 48. For example, fingers 44, 50 have spread apart to receive the next product 52 that is moving into the jaws. The amount that the fingers do or do not spread apart depends upon the diameter of the sprocket wheel relative to the dimensions of the chain parts. By the time that fingers 44, 50 reach the position shown in FIG. 2 as being occupied by fingers 44, 46, the fingers 44, 50 will have closed to grip the product 52, as product 42 is shown gripped between fingers 44, 46.

As shown in FIG. 3, the link chain 30 is trained around three principal sprocket wheels 48, 54, 56, although one or more additional sprocket wheels (such as 58) may be provided for tensioning the link chain 30 or the like. At the apex of the triangle, the sprocket wheel 48 is fixed so that it always confronts an input, such as a conveyor belt, represented by arrow 60.

Since it is not always certain that the inflow of products at 60 will be uniform and predictable, the inflow must be considered as being completely random. Therefore, a sensor 62 is positioned adjacent the conveyor chain 30 to detect whether the product is in fact present or absent in each space between adjacent fingers. Any suitable sensor may be used. A preferred sensor is a combination of a light source and a photocell positioned so that a product gripped by the fingers blocks the light from reaching the photocell. The sensor output signal is sent to a computer 64 which thereby knows and remembers the position of every product being carried by conveyor 30. Computer 64 removes the product from memory when sensor 63 detects an absence of product from the formerly occupied space as the product is delivered at buffer storage output 65.

Means are provided for adjusting the amount of product held in buffer storage—especially responsive to a delivery of a product to an output stream. More particularly, the two sprocket wheels 54, 56 are mounted on a post 66 to be raised or lowered by the turning of a feed screw. The product being carried by link chain conveyor 30 in the area 68 may be considered as being held in buffer storage. If the random inflow of products at 60 is, say a 100%, of the possible inflow, or if the outflow at 65 is delayed, perhaps more product must be held in buffer storage. Conversely, if there is, say 50% of the possible inflow, perhaps product should be taken out of buffer storage in order to maintain the desired outflow.

Therefore, the computer 64 commands a servo motor 70 to turn the feed screw 66 by a certain amount. A timing belt 71 may be used to turn the feed screw 66 by a closely controlled amount. A suitable shaft encoder may be affixed to the feed screw 66 in order to confirm that the proper number of turns have been provided.

FIG. 4 shows a situation where the feed screw 66 has raised sprocket wheels 54, 56 and thereby increased the buffer storage area from the distance 68 (FIG. 3) to the distance 72 (FIG. 4). Thus, the amount of product being held in buffer storage also increases. As the amount of product held in buffer storage increases, the increase in average product inflow may be absorbed without any change in the outflow of product.

Conversely, if product must be taken out of buffer storage, the computer 64 is aware of the need because sensor 62 has not given enough signals during a particular time frame, thereby indicating that not enough product has flowed into the fingers on conveyor chain 30. Then, computer 64 commands servo motor 70 to turn the feed screw 66 in an opposite direction to reduce buffer storage to the distance 74 (FIG. 5) as compared to the distance 68 (FIG. 3). As the buffer storage distance is reduced, product is taken out of storage to keep the outflow of product at a defined outflow.

FIGS. 6–9 show the structure for carrying out the principle illustrate by the graphical presentation of FIGS. 3–5.

The input conveyor 60 (FIGS. 6, 7) is shown as moving product toward sprocket wheel 48. The conveyor 30 has two sets of fingers 78, 80 (FIG. 7) mounted in side by side alignment so that product 81 is supported on two sides or ends. A loading mechanism 82 determines whether a single product, or two or more products will be loaded between a single set of fingers and whether two products will be stacked vertically or placed side by side. In a like manner, any other suitable loading configurations may be accommodated.

The product is carried around the conveyor 30 to an unloading location 84 where an output pick up conveyor 86 is located between the two vertical conveyors 78, 80 (FIG. 7). The output conveyor 86 has a plurality of equal-spaced, upstanding fences formed thereon. As the conveyor 86 travels in direction A, the fences 88 come up between the fingers 92, 94 on conveyor 30 which are carrying the product while in the buffer storage area, thereby sweeping product from between the fingers.

The conveyor 86 may be programmed to pick up more than one product in each product collection area 96, as for example by making fences 88 taller or by arranging to have two or more of the fingers in the pick up area. Another way to pick up multiple products is to provide a pusher represented by the arrow B (FIG. 8) to transfer product to conveyor 86 on command. For example, as shown in FIG. 6, two products between fingers 92, 94, 98 would be swept into one product collection area 96 simply by adjusting the time when a fence 88 encounters the product carried between the fingers of conveyor 30. Or, if the pusher represented by arrow B is used, any number of product may be pushed onto conveyor 86. Then, conveyor 86 may be advanced incrementally to deposit more product into the next area corresponding to area 96.

The unloading of the output conveyor 86 is controlled by a number of pushers 100–108 (FIG. 8). In greater detail, another conveyor 110 is spaced parallel to conveyor 86 and carries pushers such as 100–108 in synchronization with the movement of conveyor 86. An underlying groove moves the pushers 100–108 in synchronism with the movement of both conveyor 86 and an accompanying conveyor (not shown) carrying boxes or other containers, for example. Therefore, when properly aligned, a pusher moves from position 100 to position 102 in order to push product from conveyor 86 and into an awaiting box or container. This loading is completed by the time that the product and boxes reach position 106, where the pusher is returned to the retracted position 108.

Throughout the entire packaging sequence the computer 64 (FIG. 3) keeps track of the location of each and every product on the conveyor 30, with suitable sensors confirming the locations. To detect the presence of product at any given location, a light source directs light between the fingers 44, 46 and onto a photo cell. If a product is present, it blocks the light from the photocell. To detect the location of a finger (which is made of a material that reflects light), a light source is positioned to shine light upon a finger. A photocell next to a finger picks up the light reflected from the finger.

FIGS. 10A–E show how product may be placed in a number of different configurations prior to its insertion into a box or other container. In each of these figures, a horizontal line represents conveyor 86, two upstanding members represent adjacent fences 88, and the space between the adjacent fences is the product collection area 96.

Figure 10A:
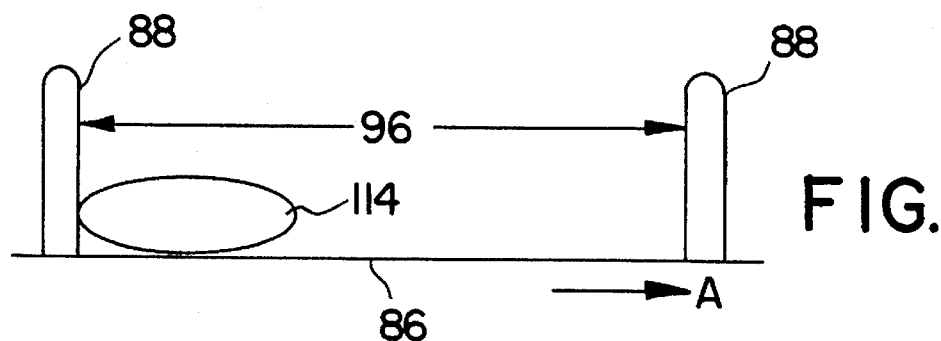

In FIG. 10A the positions of the two conveyors 30 (FIG. 6), 86 are coordinated so that the fence 88 encounters the product 114 which is in the lowest occupied set of fingers 94, 98 (FIG. 6) and pushes it into product collection area 96. This arrangement is used when a box will hold a single product.

Figure 10B:
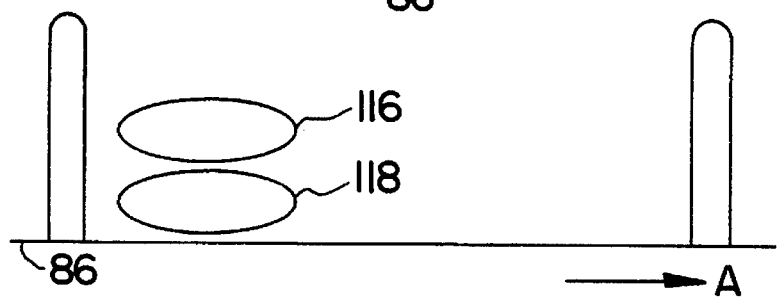

In FIG. 10B, either fence 88 or the pusher (Arrow B—FIG. 8) encounters the two products 116, 118 which are in the lowest two occupied sets of fingers 92, 94, 98 to produce a vertical stack or column of two products. In a similar manner, the stack may have any stable number of products, in preparation for boxing in a similar configuration.

Figure 10C:
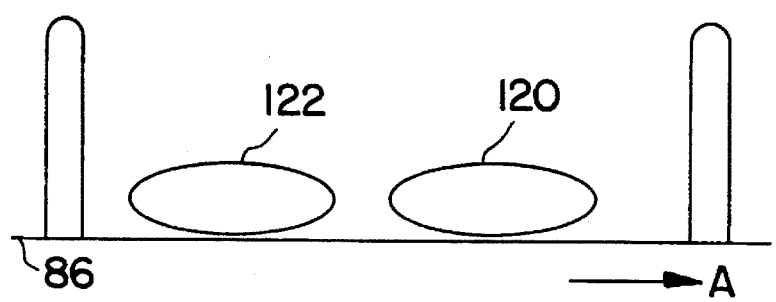

In FIG. 10C, the pusher B pushes the product 120 out of the lowest occupied set of fingers 94, 98. Then the conveyor 30 advances by a distance equal to one set of fingers and the conveyor 86 advances, say, half the length of the product collection area 96. Next, pusher B pushes out the product 122. This way two or more products will be boxed in a horizontal row.

Figure 10D:
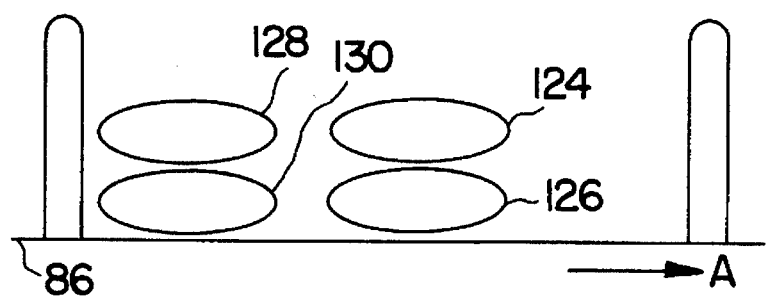

FIG. 10D is combination of FIGS. 10B and 10C where two stacks of product 124–130 are to be placed side by side in a box.

Figure 10E:
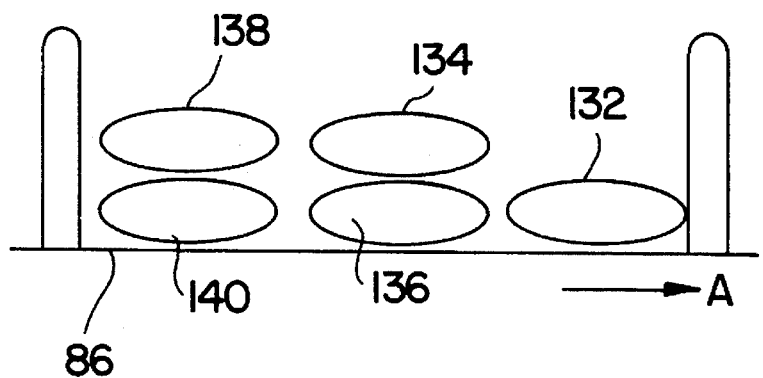

FIG. 10E illustrates a situation where a number of products are to be boxed in a unique configuration. For example, this product arrangement may be useful when the user wishes to store the products in a box having a unique configuration. Here, the conveyors 30 and 86 were at points where the pusher B would first encounter a single product 132 while conveyor 86 is at the extreme leading edge of the product collecting area 96. Then, conveyor 30 was indexed by two product positions, while conveyor 86 was indexed by one third of the length of the product collecting area 96. Next, pusher B pushed two products 134, 136 onto conveyor 86 and into area 96. Thereafter, conveyor 30 was indexed by two product positions and conveyor 86 by another third of the length of product collecting area 96. Finally, pusher B pushed the products 138, 140 onto conveyor 86 and into production collection area 96.

If a number of the products must be delivered in a specific configuration to a box or other container, it is only necessary to program the computer 64 to operate the conveyors 30, 86 to advance in a particular combination of operations.

It should now be apparent that the inventive loader provides for an extremely flexible loading capability. From the use of buffer storage, and within reason, product is always available despite random fluctuations in the inflow of product. If the random variations become too great, a sensor or sensors detect conditions which are beyond the acceptable envelope of operations and the computer 64 shuts down the machine.

Those who are skilled in the art will readily perceive how to modify the invention. Therefore, the appended claims are to be construed to cover all equivalent structures which fall within the true scope and spirit of the invention.

The claimed invention is:

1. A general purpose synchronizer loading sequencer module for use at any selected one of many locations in an automatic packaging machine comprising: buffer storage means; means for delivering an inflow of product to said buffer storage means, said inflow being subject to a randomly variable product delivery; means for receiving and delivering from said buffer storage means an outflow of product at a defined rate and in a predetermined pattern; said buffer storage means accommodating differential product flow rates by storing an adjustable amount of product between said randomly variable inflow and said defined outflow in order to synchronize operations by compensating for said randomly variable inflow: and computer means responsive to said randomly variable inflow for controlling said adjustable amount of product in said buffer storage means and for releasing said produce from said buffer storage means in synchronism with said defined outflow.

2. The loader sequencer module of claim 1 wherein said buffer storage means comprises a link chain trained over at least three sprocket wheels generally arranged in a somewhat triangular configuration, means associated with said link chain for carrying product, one of said three sprocket wheels being at an apex of said triangular configuration and being at a location for receiving said randomly variable inflow of product from said means for delivering said randomly variable inflow, means for movably mounting two of said three sprocket wheels at base angles of said triangular configuration for movement relative to a location for delivering said defined outflow of product to said means for receiving and delivering said defined outflow of product, and means for moving said two sprocket wheels to increase or decrease a length in a base of said triangular configuration between said receiving location of said randomly variable inflow and said delivering location of said defined outflow thereby increasing or decreasing an amount of product buffer stored in order to compensate for said randomly variable inflow of product.

3. The loading sequencer module of claim 2 and a plurality of spaced fingers carried by said link chain, at least some of said fingers being separated by a distance which carries at least one product.

4. The synchronizer loading sequence module of claim 2 wherein said means for receiving and delivering said defined outflow of product has a plurality of product collection areas for sequentially picking up product at said delivering location of said defined outflow, and further comprising means for delivering product to said product collection areas in a predetermined configuration.

5. The synchronizer loading sequencer module of claim 4 wherein said predetermined configurations are taken from a group consisting of a single product; a row of products; a column of products; a combination of rows and columns; a combination of rows and single products; a combination of columns and single products; and a combination of rows, columns, and single products.

6. The synchronizer loading sequencer module of any one of the claims 1–5 and sensor means for detecting a location of a products in said buffer storage means, means responsive to said sensor means for operating said computer means for remembering where each product is located in said buffer storage means, and means responsive to said computer means for making said adjust means of said amount of buffer storage of product and for releasing said product at said delivering location.

7. A general purpose computer controlled, buffer storage module for use in an automatic packaging machine, said automatic packaging machine having at least a pair of conveyors following at least part of a predetermined path extending from a product pick up input point to a product delivery output point, a first of said pair of conveyors being subject to a lack of coordinated delivery of product, a second of said pair conveyors having a defined delivery output, said buffer storage module comprising: a computer, said module including a buffer conveyor means controlled by said computer for transporting product from said first to said second of said pair of conveyors, said computer compensating for lack of coordination in said delivery from said first to said second conveyor by increasing a length of a time required for said product to pass through said buffer conveyor means in order to buffer store more product and for decreasing the length of said time in order to reduce a number of product in said buffer conveyor means said general purpose module further comprising means also controlled by said computer for delivering product from said first conveyor to said second conveyor with an output delivery in a selected one of a plurality of configurations of product at said output point.

8. The module of claim 7 wherein said computer further comprises means for storing a memory of each product in said buffer conveyor means, means for programming removal of product from said buffer conveyor means in accordance with a predetermined packaging need, and means for removing the memory of each product as it is removed from said buffer conveyor means and delivered to said second conveyor.

9. The module of claim 8 wherein said configurations are taken from a group consisting of individual products, a row of products, a column of products, a combination of at least one row and at least one column of product, a combination of at least one row and a single product, and a combination of at least one column and a single product.

10. A general purpose buffer storage module device for use in an automatic packaging machine where there is an unsynchronized transfer of product from a first part to a second part of said automatic packaging machine, said general purpose buffer storage module device comprising a belt at an output of said module device, said belt having upstanding fences thereon for defining between them product receiving areas, said second part of said automatic packaging machine being associated with said belt, a link chain supported by a plurality of sprocket wheels, a plurality of fingers attached to said link chain for carrying product, means for buffer storing a plurality of product carried by said fingers along a length of said link chain as said ink chain follows a predetermined path around said sprocket wheels, means for detecting random variables associated with an operation of said automatic packaging machine which results from said unsynchronized transfer between said parts of said machine, said random variables effecting the uniformity of delivery of an output flow of product from said first part to said second part of said automatic packaging machine, computer means responsive to said detection of said random variables for moving said sprocket wheels in order to increase or decrease said length of said link chain in said general purpose buffer storage module device which extends between said first part and said second part of said automatic packaging machine for increasing or decreasing said buffer storage means to maintain the uniformity in said output flow of said product, and means also responsive to said computer means for moving said belt in an independently programmed manner for receiving said output flow of product in any one of many output configurations of product.

11. The device of claim 10 wherein said plurality of sprocket wheels include at least three of said sprocket wheels generally arranged in a somewhat triangular configuration, one of said three sprocket wheels being at an apex of said triangular configuration and being located to receive a random inflow of product from said first part of said automatic packaging machine, means for movably mounting the other two of said three sprocket wheels at base angles of said triangular configuration for movement relative to a location of a defined outflow of product, and means for moving said two sprocket wheels to increase or decrease said length in a base of said triangular configuration leading to said location of said defined outflow thereby increasing or decreasing an amount of time that product is buffer stored in said length of said base.

* * * * *